United States Patent [19]

Diersing

[11] 3,787,712
[45] Jan. 22, 1974

[54] PLUG-ON CIRCUIT BREAKER MOUNTING DEVICE PLUGGABLE ONTO A BUS BAR STACK FOR RELATIVELY LARGE PLUG-ON CIRCUIT BREAKERS AND INCLUDING MEANS FOR MOUNTING RELATIVELY SMALL PLUG-ON CIRCUIT BREAKERS NOT PLUGGABLE DIRECTLY ONTO THE BUS BAR STACK

[75] Inventor: Raymond A. Diersing, Lexington, Ky.

[73] Assignee: Square D. Company, Park Ridge, Ill.

[22] Filed: Oct. 17, 1972

[21] Appl. No.: 298,316

[52] U.S. Cl. ............. 317/119, 339/22 B, 174/71 B
[51] Int. Cl. ............................................. H02b 1/04
[58] Field of Search ......................... 317/117–120; 339/22 B; 174/70 B, 71 B

[56]          References Cited
              UNITED STATES PATENTS
2,906,811   9/1959   Fisher................................ 339/22 B 3,588,620   6/1971   Wasileski........................... 317/119
3,354,357   11/1967  Jorgensen.......................... 317/119
3,172,015   3/1965   Darlow............................... 317/119
3,619,727   11/1971  Hackenbroch...................... 317/119

*Primary Examiner*—Herman J. Hohauser
*Assistant Examiner*—Gerald P. Tolin

[57]          ABSTRACT

An electrical switchboard includes an enclosure and a plurality of flat bus bars arranged in a stack with flat sides parallel to a rear wall of the enclosure. Power is supplied to the bus bars through a main circuit breaker and fed to relatively large loads through relatively large circuit breakers pluggable onto the edges of the bus bars. Relatively small loads are fed through relatively small circuit breakers mountable on a mounting device which can be plugged onto the edges of the bus bars.

2 Claims, 5 Drawing Figures

PATENTED JAN 22 1974 3,787,712

PLUG-ON CIRCUIT BREAKER MOUNTING DEVICE PLUGGABLE ONTO A BUS BAR STACK FOR RELATIVELY LARGE PLUG-ON CIRCUIT BREAKERS AND INCLUDING MEANS FOR MOUNTING RELATIVELY SMALL PLUG-ON CIRCUIT BREAKERS NOT PLUGGABLE DIRECTLY ONTO THE BUS BAR STACK

This invention relates generally to electrical panelboards and more particularly to a plug-on circuit breaker mounting device for service section switchboards.

It is an object of the present invention to provide such a circuit breaker mounting device for mounting in a switchboard which permits simple, reliable and safe conversion of a switchboard having a main bus with a relatively high current carrying capacity at least partially into a plurality of distribution circuits each having a relatively lower current carrying capacity.

It is another object of the invention to provide such a circuit breaker mounting device which is an integral unit, which may be selectively installed in or removed from a switchboard and which simply and safely receives and supports a plurality of circuit controlling devices each having substantially the relatively lower current carrying capacity.

Other objects, features and advantages of the present invention will become apparent from the following description of a particular embodiment, taken together with the attached drawings thereof, in which.

Figure 1:
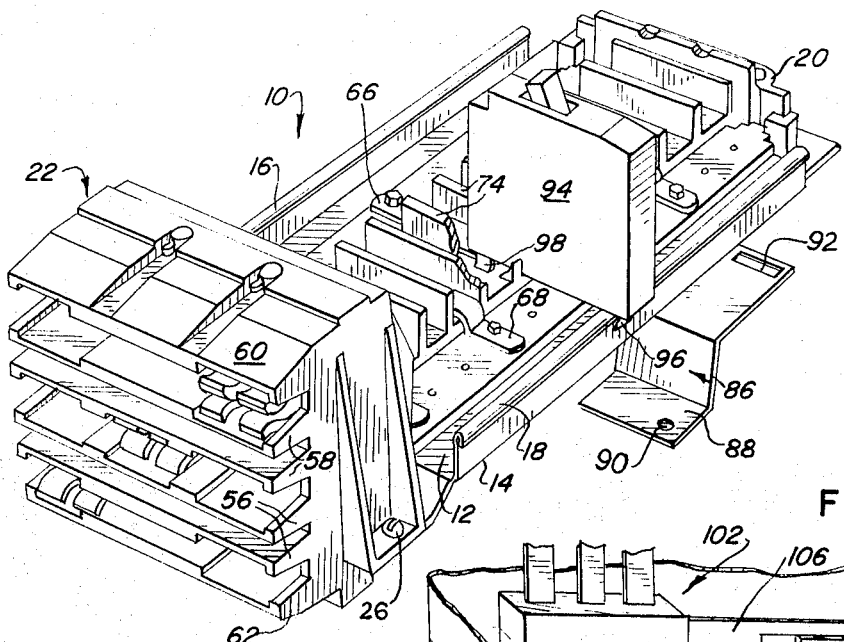
FIG. 1 is a perspective view, taken generally from the bottom, and partially broken away, of a plug-on circuit breaker mounting device constructed in accordance with the invention.

Referring now to FIG. 1, there is shown a plug-on circuit breaker mounting device, generally designated 10, suitable for use with an electrical switchboard of the type shown in copending application, Ser. No. 298,320, filed Oct. 17, 1972, and assigned to the assignee of this application and which includes an enclosure and an electrical panelboard, similar to those disclosed in Jorgensen et al., U.S. Reissue Pat. No. 26,737, dated Dec. 9, 1969, which has a three-phase electrical circuit including three parallel electrical buses suitably separated by parallel member molded of insulating material. Mounting device 10 includes a sheet metal base member or mounting pan 12 having its sides turned upwardly at 14 and return looped upon themselves to present continuous rolled-over mounting beads or bars at 16 and 18 which extend substantially the entire length of pan 12. The insulating portions of the mounting device 10 include, at one end, an end insulator 20 which constitutes an end barrier and, at the other end, an insulating shroud 22, to be discussed in greater detail below. Four insulating base sections 24 (See FIG. 3) suitable for three-phase busing are interposed between end insulator 20 and shroud 22 to provide space for a plurality of circuit controlling units. Such insulating base sections are shown, for example, in Stanback et al., U.S. Pat. No. 2,902,632, dated Sept. 1, 1959. As is illustrated in FIG. 6 of that patent, each insulating base section is provided with a slot along its lower legs and a complementary projection at the opposite end of the insulating base section with the slots and projections in adjacent insulating base sections being interengageable to provide for alignment of adjacent insulating base sections. One end of each insulating base section is provided with a recess to allow accommodation space for a complementary portion at the opposite end of the adjacent insulating base section so that the adjacent sections fit snugly to present a continuous row of insulating units.

In assembling the insulating base sections within the pan 12, terminal end insulator 20 is fixed in place with screws 25 extending through end insulator 20 and pan 12 and four insulating base sections 24 are assembled and joined together and placed in the pan 12 against end insulator 20. Then, the shroud 22 is positioned and secured by suitable screws 26 (See FIG. 3) extending through the shroud 22 and pan 12 to hold the insulating base sections tight against end insulator 20, the entire assembly being insulated from the metallic portions of pan 12 by suitable strips of insulating material to be described below. A neutral bar (not shown), provided with a plurality of neutral connecting terminals, may be supported on end insulator 20 by suitable means.

Figure 2:
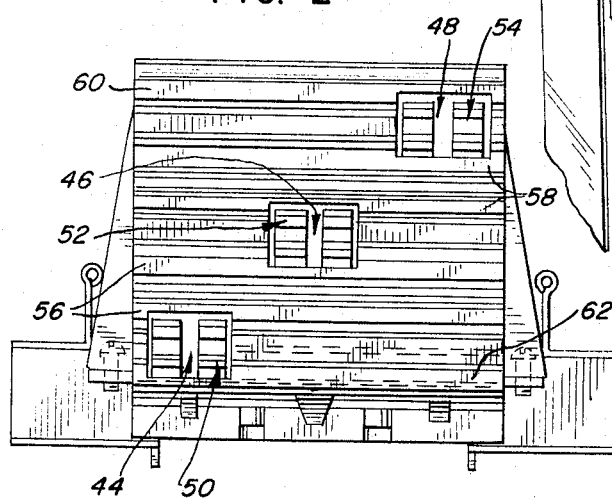
FIG. 2 is a view in bottom elevation of the circuit breaker mounting device of FIG. 1.

Three main buses are provided extending substantially the length of the pan 12 at 28, 30 and 32 and are positioned at one end in slots in end insulator 20 near the base portion thereof. Buses 28, 30 and 32 are mounted on suitable screws in shroud 22 and secured respectively with three nuts 34. Three conducting straps 36, 38 and 40 are secured to buses 28, 30 and 32, respectively, by the nuts (FIGS. 2 and 3) and extend downwardly from buses 28, 30 and 32, respectively, into the shroud 22. Conducting straps 36, 38 and 40 are formed to extend through openings 44, 46 and 48, respectively, (FIG. 2) through the shroud 22 and terminate in pairs of metallic jaws 50, 52 and 54, respectively, which are separated by suitable pairs of molded insulating strips 56 and 58 formed on the base of the shroud 22. Front and rear molded insulating strips 60 and 62, respectively, are also formed on the base of the shroud 22 and rectangular laminar paper and plastic insulating strips 63 and 64 (FIG. 4), respectively, are provided between pan 12 and end insulator 20, insulating base sections 24, the shroud 22 and buses 28, 30 and 32.

Figure 3:
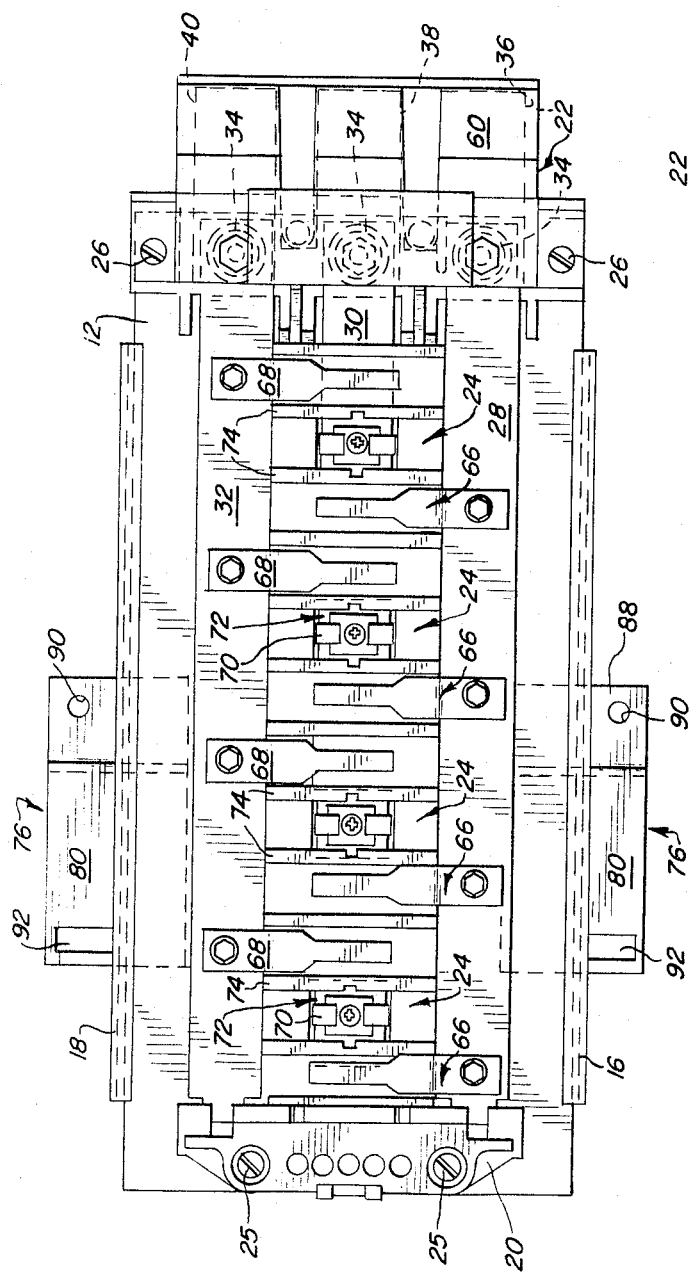
FIG. 3 is a view in front elevation of the mounting device.
Figure 4:
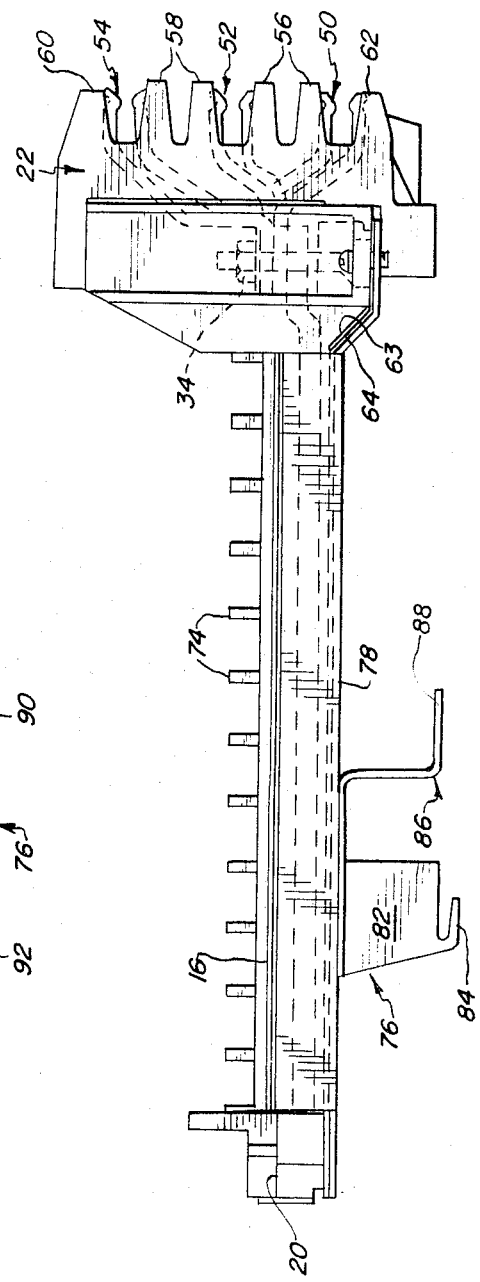
FIG. 4 is a view in side elevation of the mounting device.

As is best shown in FIG. 3, the branch buses for the two outer main buses 28 and 32 are constituted by offset conducting straps 66 and 68, respectively. The terminal attachment bus for the central main bus 30 is constituted by a solid or formed conductor 70 extending through a central hole 72 in each of the four insulating base sections 24. The branch buses 66 and 68 are individually attached to their respective main buses 28 and 32, respectively, by suitable screws as shown in FIG. 3 and the branch bus 70 for the central main bus 30 is provided with suitable side ribs cooperating with grooves in each insulating base section 24 to assure proper alignment therewith. The branch buses 66 and 68 are maintained in proper alignment through cooperation with respective portions of the branch units of the insulating base sections 24.

As shown in FIG. 3, the interior ends of buses 66 and 68 are reduced in width and extend beyond the centers of insulating base sections 24 to provide terminal areas accessible to circuit controlling units (See FIG. 1, for example) which may be supported at both sides of the mounting device as will be explained more fully hereinafter. The branch bus 70 has similar widths at both sides of the central panelboard to provide access for end-to-end mounting of circuit breakers.

Insulating base sections 24 are each provided with upwardly extending insulation barriers 74 separating the branch buses 66, 68 and 70 and defining the access areas for the circuit controlling units to be mounted in the circuit breaker mounting device.

A pair of mounting brackets, each generally designated 76, are suitably secured, for example, by welding, to the rear surface 78 of pan 12. Each bracket 76 is formed to define a bight portion 80, an inner leg portion 82, the free end portion of which is provided with a hook portion 84, and forwardly of the leg portion 82 an L-shaped portion 86 defining a mounting plate 88 having a threaded aperture 90 therethrough which is arranged to receive a suitable mounting screw (not shown) to secure pan 12 to a mounting pan or interior wall in the switchboard enclosure. A rectangular aperture 92 is provided within bight portion 80 and is arranged to receive the tip of a screwdriver or other appropriate tool which may be inserted into a corresponding aperture in the interior wall in the switchboard enclosure.

A single-pole circuit breaker or controlling unit 94 is shown in a mounted position in FIG. 1 for purposes of illustration. It will be readily appreciated from the discussion which follows that two- or three-pole devices also may be employed with a plug-on circuit breaker mounting device constructed in accordance with the instant invention. As is disclosed in the above Stanback et al. patent, circuit controlling unit 94 has spring clips and terminals for mechanically and electrically connecting the unit into the mounting device. The unit has a pair of spring clip devices 96 and 98. Spring clip device 96 is insulated from the mechanism of the circuit controlling unit and the spring clip device 98 constitutes a current carrying terminal. Spring clip device 96 is constituted by a resilient, non-current carrying spring clip supported on insulation portions of the circuit controlling unit and secured between the cover and base of the unit during assembly thereof. Spring clip device 98 is constituted by a current carrying portion of the circuit controlling unit cooperating with the interior mechanism of the unit and may be a conducting jaw carrying at its inner portions a stationary contact which cooperates with the movable contact of the circuit controlling unit. Spring clip device 98 cooperates with portions of the insulating base of circuit controlling unit 94 and is supported in unit 94 and maintained in place by the insulating cover and base of unit 94 when unit 94 is assembled. It should be noted that the axes of spring clip devices 96 and 98 in each unit 94 are rotated 90° with respect to each other in order to facilitate the location and mounting of the electrical and mechanical supporting parts for the circuit controlling units in the mounting device 10.

As shown in FIG. 1, the non-conductive spring jaws 96 of circuit controlling unit 94 are mechanically engaged and clamped over the rolled over mounting bead or bar 18 provided on pan 12 and, therefore, the current carrying spring clips electrically and mechanically engage an end of the associated branch bus 66.

Figure 5:
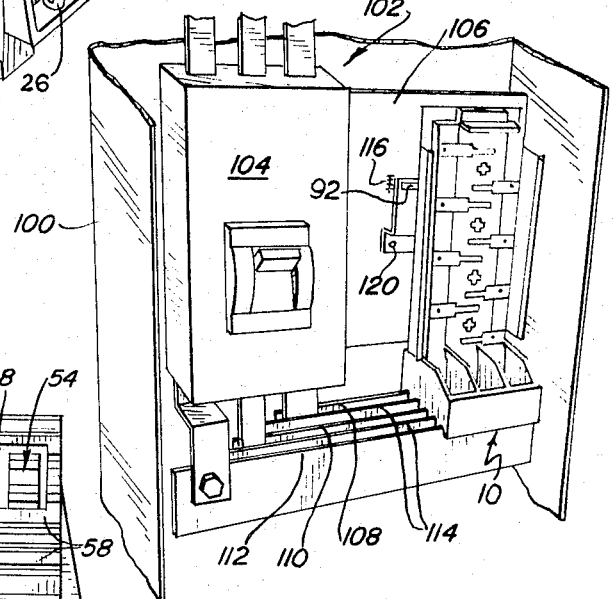
FIG. 5 is a front perspective view, partially broken away, showing portions of a switchboard enclosure with a circuit breaker mounting device mounted therein.

FIG. 5 shows portions of a service section switchboard 100 including an enclosure, generally designated 102, and having within enclosure 102 a main circuit breaker 104 supported on an interior mounting pan 106 and, extending from terminal straps on the base of main breaker 104, three parallel horizontal main electrical bus bars 108, 110 and 112 suitably supported within enclosure 102 on another mounting pan (not shown) and separated from each other by strips 114 of insulating material. The mouting pan 106 is provided with two series of ratchet slots 116 (only one series shown in FIG. 5) and, below each series of slots 116, an aperture (designated 118, but not shown in the drawings), which is positioned to be aligned with an aperture 90 in the L-shaped portion 86 of a mounting bracket 76 when the jaws 50, 52, and 54 of a mounting device 10 have been firmly positioned in place respectively on bus bars 108, 110 and 112. A suitable aperture is provided in the mounting pan 106 adjacent each series of ratchet slots 116 and is arranged to receive a hook portion 84.

When it is desired to install a plug-on circuit breaker mounting device 10, the front covers (not shown) of the switchboard 100 are removed, jaws 50, 52 and 54 of the circuit breaker mounting device are plugged onto bus bars 108, 110 and 112, respectively, within enclosure 102, with the insulating strips 114 positioned in the recesses between pairs 56 and 58 of insulating strips on the shroud 22. A screwdriver or other tool may be inserted in either aperture 92 through bight portions 80. The handle of the tool may then be moved toward bus bars 108, 110 and 112 to force the pairs of plug-on jaws thereon. Several prying steps may be used with the tip of the tool engaging successive ratchet slots in each series 116. When the circuit breaker mounting device 10 is in the proper position, a screw 120 may be inserted through each aperture 90 and turned until the tip of screw 120 enters the appropriate aperture 118 in the interior panelboard 106 to maintain the mounting device 10 in mounted position, with the plug-on jaws 50, 52 and 54 properly engaged respectively with corresponding edge portions of the bus bars 108, 110 and 112. Hook portions 84 received in the apertures adjacent the series of ratchet slots 116 prevent the pulling of the circuit breaker mounting device 10 away from interior mounting pan 106 at the end portion of mounting device 10 adjacent brackets 76. The desired number of one-, two- and three-pole circuit controlling units may be inserted in place on the mounting beads 16 and 18 and appropriate branch buses 66, 68 and 70 (which are disposed parallel to the three-phase main bus bars 108, 110 and 112 when the mounting device 10 is installed) on the mounting device 10 after the mounting device 10 has been installed on the mounting pan 106 of the switchboard 100.

It will be apparent that the circuit controlling units may be mounted to either the right or left hand side of the circuit breaker mounting device 10 and have access to branch buses attached to either of the outer main buses 28 and 32 or to the central main bus 30 since a portion of each branch bus extends on both sides of the center of the insulating base sections. Thus, as many as 24 individual single-pole circuit controlling units may be accommodated by the described embodiment of the invention and correspondingly smaller numbers of twoand three-pole circuit controlling units may be received thereon.

In a typical installation employing a plug-on circuit breaker mounting device 10, constructed in accordance with the invention, a 240 volt A.C., 600-800 ampere main buses 108, 110 and 112 are provided in the switchboard enclosure and the mounting device 10 furnishes 24 single-pole spaces suitable for mounting one-, two- or three-pole circuit breakers, rated from 15 through 100 amperes.

While a particular embodiment of the invention has been shown and described, it will be apparent to those skilled in the art that various modifications in form and detail may be made therein without departing from the spirit and scope of the appended claims.

I claim:

1. An assembly comprising a switchboard having a plurality of flat bus bars aligned flatwise in a stack and spaced to receive plug-on jaws of relatively large circuit breakers and a plug-on mounting device for relatively small circuit breakers not suitable for plugging directly onto the bus bars of the switchboard, the plug-on mounting device comprising a plurality of main buses each having a smaller current capacity than each of said switchborad bus bars, each of the main buses having a plurality of branch buses and each of the branch buses receiving plug-on jaws of a relatively small circuit breaker, a plurality of pairs of plug-on jaws on said mounting device spaced from each other in one direction correspondingly to the spacing of the bus bars of the switchboard and plugged thereon, and means electrically connecting the pairs of plug-on jaws respectively to the main buses.

2. A plug-on mounting device as claimed in claim 1 including a shroud of insulating material for the pairs of plug-on jaws.

* * * * *

UNITED STATES PATENT OFFICE
CERTIFICATE OF CORRECTION

Patent No. 3,787,712   Dated January 22, 1974

Inventor(s) Raymond A. Diersing

It is certified that error appears in the above-identified patent and that said Letters Patent are hereby corrected as shown below:

Column 2,
lines 53 and 54 - change "The terminal attachment" to --A branch--
Column 2, line 65 - delete "branch units of the"; Column 3, line 1 - after "of" insert --the branch--.

Signed and Sealed this eighteenth Day of May 1976

[SEAL]

Attest:

RUTH C. MASON
Attesting Officer

C. MARSHALL DANN
Commissioner of Patents and Trademarks